United States Patent
Yang et al.

(10) Patent No.: US 9,541,728 B2
(45) Date of Patent: Jan. 10, 2017

(54) GLASSES HOLDER

(71) Applicants: BOE TECHNOLOGY GROUP CO., LTD., Beijing (CN); BEIJING BOE VISION-ELECTRONIC TECHNOLOGY CO., LTD., Beijing (CN)

(72) Inventors: Jinglong Yang, Beijing (CN); Lu Li, Beijing (CN)

(73) Assignees: BOE TECHNOLOGY GROUP CO., LTD., Beijing (CN); BEIJING BOE VISION-ELECTRONIC TECHNOLOGY CO., LTD., Beijing (CN)

(*) Notice: Subject to any disclaimer, the term of this patent is extended or adjusted under 35 U.S.C. 154(b) by 95 days.

(21) Appl. No.: 14/429,959

(22) PCT Filed: May 28, 2014

(86) PCT No.: PCT/CN2014/078709
§ 371 (c)(1),
(2) Date: Mar. 20, 2015

(87) PCT Pub. No.: WO2015/096386
PCT Pub. Date: Jul. 2, 2015

(65) Prior Publication Data
US 2016/0041358 A1 Feb. 11, 2016

(30) Foreign Application Priority Data
Dec. 26, 2013 (CN) .......................... 2013 1 0733511

(51) Int. Cl.
*B23Q 1/25* (2006.01)
*G02B 7/00* (2006.01)
(Continued)

(52) U.S. Cl.
CPC ................ *G02B 7/00* (2013.01); *F16B 2/065* (2013.01); *G01M 11/02* (2013.01);
(Continued)

(58) Field of Classification Search
CPC ........ B25B 1/2426; B25B 5/102; B25B 5/085; B25B 11/02; B25B 11/007; B23Q 1/25
See application file for complete search history.

(56) References Cited

U.S. PATENT DOCUMENTS 4,096,023 A * 6/1978 Bivens ...................... B25B 5/14
100/290
4,850,690 A   7/1989 Parker et al.
(Continued)

FOREIGN PATENT DOCUMENTS

CN      1648629       8/2005
CN      1690680 A    11/2005
(Continued)

OTHER PUBLICATIONS

First Chinese Office Action issuing date Jun. 3, 2015; Appln. No. 201310733511.X.
(Continued)

*Primary Examiner* — Lee D Wilson
(74) *Attorney, Agent, or Firm* — Ladas & Parry LLP

(57) ABSTRACT

A glasses holder including: a clamping unit for securing the glasses; a connection unit connected with the clamping unit and an optical device respectively, so that an eyeglass of the glasses secured by the clamping unit is parallel to an incident surface of optical lens of the optical device. The glasses holder is used for testing of related specs on TV performances, and can improve accuracy of test results.

14 Claims, 5 Drawing Sheets

(51) Int. Cl.
G02C 1/00 (2006.01)
G01M 11/02 (2006.01)
H04N 13/00 (2006.01)
F16B 2/06 (2006.01)
G02B 27/01 (2006.01)
H04N 17/00 (2006.01)

(52) U.S. Cl.
CPC ..... *G01M 11/0214* (2013.01); *G02B 27/0176* (2013.01); *G02C 1/00* (2013.01); *H04N 13/00* (2013.01); *G02B 2027/0134* (2013.01); *G02B 2027/0178* (2013.01); *H04N 17/00* (2013.01)

(56) References Cited

U.S. PATENT DOCUMENTS

| | | | | |
|---|---|---|---|---|
| 5,433,810 | A * | 7/1995 | Abrams | B29C 65/7841 156/272.2 |
| 6,053,476 | A * | 4/2000 | Chapman | B66F 11/048 254/124 |
| 6,073,913 | A * | 6/2000 | Chapman | B66F 11/048 254/124 |
| 2004/0061849 | A1 | 4/2004 | Kubota | |
| 2005/0162642 | A1 | 7/2005 | Yanagi et al. | |
| 2005/0237513 | A1 | 10/2005 | Hayashi et al. | |
| 2011/0187996 | A1 | 8/2011 | Ueno et al. | |
| 2011/0242481 | A1 | 10/2011 | Wada | |

FOREIGN PATENT DOCUMENTS

| | | |
|---|---|---|
| CN | 201122124 Y | 9/2008 |
| CN | 102138776 A | 8/2011 |
| CN | 102207636 A | 10/2011 |
| CN | 103698872 A | 4/2012 |
| CN | 202903456 U | 4/2013 |
| CN | 203116942 U | 8/2013 |
| EP | 0600666 A1 | 8/1994 |
| JP | 2006-064614 A | 3/2009 |
| WO | 2011107529 A1 | 9/2011 |

OTHER PUBLICATIONS

Chinese Notice of Allowance issuing date Oct. 10, 2015; Appln. No. 201310733511.X.
International Search Report Appln. No. PCT/CN2012/078709; Dated Oct. 10, 2014.
Written Opinion of the International Searching Authority appln. No. PCt/CN2014/078709; Dated Oct. 10, 2014.
First Chinese Office Action Appln. No. 201310733511.X; Dated Jun. 3, 2015.

* cited by examiner

GLASSES HOLDER

TECHNICAL FIELD

Embodiments of the present disclosure relate to a glasses holder.

BACKGROUND

With the increasing popularization of 3D TVs, related specs about 3D TV performances to be tested by TV makers is getting more and more. Active Shutter 3D and Polarization 3D prevail main stream of current 3D technology, and it's required to mount a matched 3D glasses in front of optical lens of an optical device for both of them. And a common manner at present is to secure the 3D glasses in front of the optical lens, for example is adhered by means of a bonding tape. However, securing the glasses in this way is unstable and tends to be contaminated, and accordingly, accuracy of test results would be influenced.

SUMMARY

One of the objects of embodiments of the present disclosure is to provide a glasses holder so that the glasses can be reliably secured in front of optical lens of an optical test device, accordingly the glasses can be firmly mounted, contamination to the glasses can be depressed and thus accuracy of test results can be improved.

For achieving the above objects, at least one embodiment of the present disclosure provides a glasses holder comprising:

a clamping unit for securing a glasses;

a connection unit connected with the clamping unit and an optical device respectively, so that an eyeglass of the glasses has an optical axis parallel or coincide with an optical axis of optical lens of the optical device.

In one embodiment according to the present disclosure, the clamping unit comprises:

a first support bracket and a second support bracket, main planes of which are both provided with a hollow region, and area of each hollow region is greater than or equal to that of an incident surface of the optical lens, the main planes of the first and second support bracket are each perpendicular to the optical axis of the optical lens of the optical device;

a fastener for flexibly connecting the first support bracket with the second support bracket, so that the glasses is clamped between the main planes of the first support bracket and the second support bracket, and the light received by the optical lens passes through the hollow region of the first support bracket, one eyeglass of the glasses, and the hollow region of the second support bracket.

According to one embodiment of the present disclosure, the fastener comprises two sets of bolt and corresponding screw nut, and each of the sets comprises at least one bolt and corresponding screw nut;

The two sets of securing bolts are arranged in matrix in a direction perpendicular to a placement surface of the optical device, respectively connecting the upper and lower ends of the first support bracket and the second support bracket, so that an eyeglass of the glasses between the main planes of the first and second support brackets is secured.

According to one embodiment of the present disclosure, the lower ends of the first and second support brackets are flexibly connected;

The fastener comprises a set of securing bolts and corresponding screw nuts, and each set comprises at least one bolt and corresponding screw nut, for connecting the upper ends of the first and second support brackets, so that one eyeglass of the glasses is secured between the main planes of the first and second support brackets.

According to one embodiment of the present disclosure, the fastener comprises a set of bolt, and each set comprises at least one bolt;

an elastic element sleeved on a stem of each of the bolt;

a snapper for snapping with the tail of the stem of each of the bolts;

the stems of the bolts pass through the main plane of the first support bracket and the main plane of the second support bracket, the elastic element is arranged between the main planes of the first and second support brackets, and by snapping with the snapper, the bolt connects the upper ends of the first and second support brackets, so that an eyeglass of the glasses is secured between the main planes of the first and second support brackets.

According to one embodiment of the present disclosure, the clamping unit further comprises:

slideways disposed at the main planes of the first and second support brackets, the length direction of which is perpendicular to the placement surface of the optical device;

the screw stem of the bolt passing through the slideway and connecting the first and second support bracket, and capable of moving along the slideway in the direction perpendicular to perpendicular to the placement surface of the optical device.

According to one embodiment of the present disclosure, sides of the main planes of the first and second support brackets contacting with the glasses are provided with flexible gaskets.

According to one embodiment of the present disclosure, the connection unit comprises:

a first connection element enabling the clamping unit to move in a direction parallel to the optical axis of the optical lens; and a second connection element enabling the clamping unit to move in a direction perpendicular to the optical axis of the optical lens and parallel to the placement surface of the optical device.

According to one embodiment of the present disclosure, the first connection element is a connection plate provided with a first snapping slot, and the length direction of the first snapping slot is parallel to the optical axis of the optical lens, and the first snapping slot is connected with the base of the optical device movably with respect to each other.

According to one embodiment of the present disclosure, the second connection element is a connection plate provided with a second snapping slot, and the length direction of the second snapping slot is perpendicular to the optical axis of the optical lens and parallel to the placement surface of the optical device, and the second snapping slot is connected with the base of the optical device movably with respect to each other.

At least one embodiment of the present disclosure provides a glasses holder comprising: a clamping unit for securing a glasses; a connection unit connected with the clamping unit and an optical device respectively, so that an eyeglass of the glasses secured by the clamping unit is parallel to the incident surface of the optical lens of the optical device. In this way, the connection unit of the glasses holder connects with the clamping unit and with the optical test device, in such a way that the clamping unit can be effectively connected with the optical test unit, and by holding the glasses by means of the clamping unit, the glasses can be effectively secured in front of the optical lens of the optical test device, and accordingly the glasses could be firmly secured, contamination to the glasses can be depressed, thereby accuracy of test result is improved.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
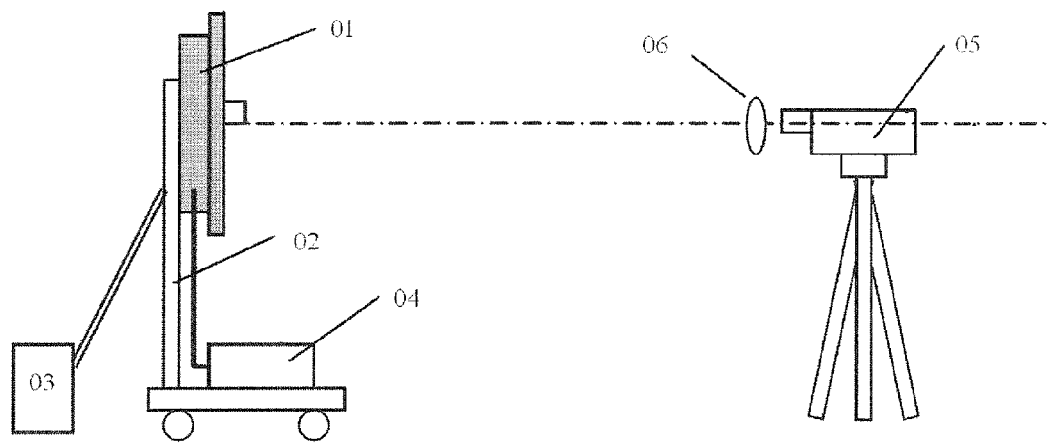
FIG. 1 is a schematic structural view illustrating a optical test system.

Currently, 3D optical performance test in TV industry mainly covers the following specs: 3D on-off ratio, 3D contrast, 3D brightness uniformity, 3D chroma uniformity, white chroma uniformity, binoculus aberration, binoculus crosstalk, property of viewing angle and the like. The prevailing 3D technologies are Active Shutter 3D technology and Polarization 3D technology; it's required to wear dedicated 3D glasses so as to achieve 3D display effect. The test for above 3D optical specs is carried out by employing a test system as illustrated in FIG. 1, which comprises:

A TV 01, a bracket 02, a power supply 03, a driving signal source 04, an optical test device 05, glasses 06. The bracket 02 is configured to support the TV 01, the power supply 03 is connected to the TV 01 to supply electric power to the TV 01, and the driving signal source 04 is coupled to the TV 01 to supply driving signal used for test, the optical test device 05 is spaced from the TV 01 by a certain distance, which is usually 3 times of the height of the screen of the TV 01, the optical lens of the optical test device 05 is aligned with the screen of the TV 01, and the glasses 06 is located in front of optical lens of the optical test device 05, that is, between the TV 01 and the optical test device 05. In the technologies know to the inventor, the glasses 06 is secured in front of the optical lens through sticking by means of a bonding tape.

Figure 2:
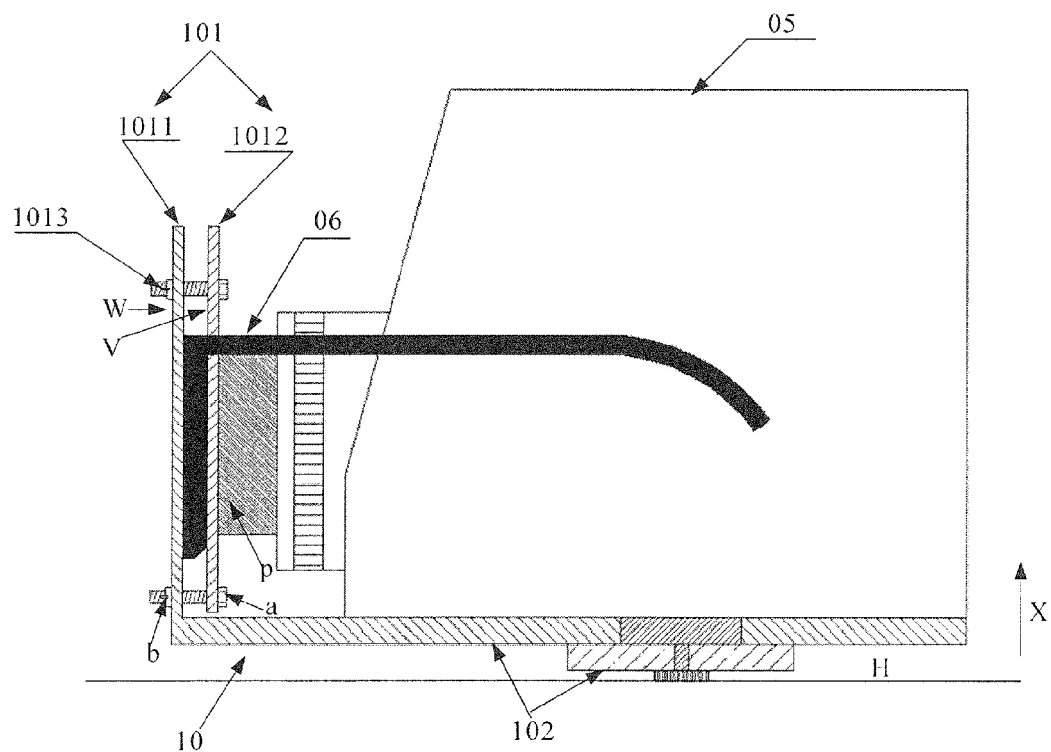
FIG. 2 is a structural side view illustrating a glasses holder according to one embodiment of the present disclosure.

As illustrated in FIG. 2, an embodiment according to the present disclosure provides a glasses holder 10 comprising:

a clamping unit 101 for securing a glasses 06; and a connection unit 102 connected with the clamping unit 101 and with an optical test device 05 respectively, so that an eyeglass of the glasses 06 secured by the clamping unit 101 has an optical axis parallel to or coincide with an optical axis of the optical lens p of the optical test device 05.

In this way, the connection unit of the glasses holder connects the clamping unit and the optical test device, such that the clamping unit can be effectively connected with the optical test device, and by holding the glasses through the clamping unit, the glasses can be effectively secured in front of the optical lens of the optical test device, and accordingly contamination to the glasses can be depressed, thereby accuracy of test result is improved.

Figure 3:
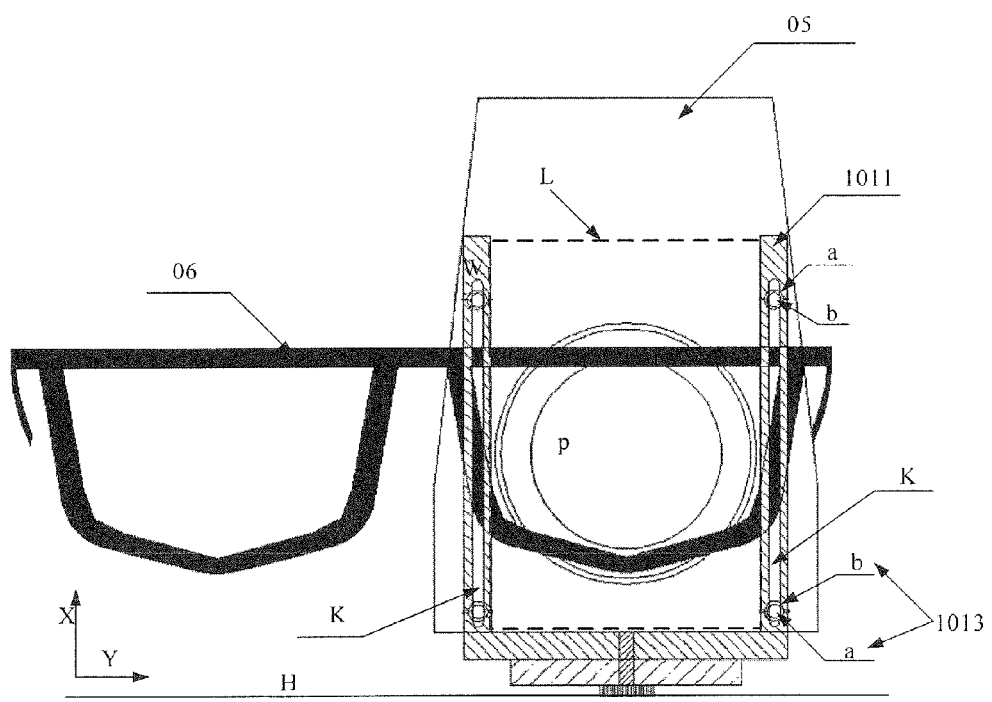
FIG. 3 is a structural front view showing the glasses holder as illustrated in FIG. 2.

Furthermore, as illustrated in FIG. 2, the clamping unit 101 comprises: a first support bracket 1011 and a second support bracket 1012 and a fastener 1013, the main plane W of the first support bracket 1011 is parallel with the main plane V of the second support bracket 1012, and the main plane W of the first support bracket 1011 and the main plane V of the second support bracket 1012 are each provided with a hollow region L, the hollow region L is a region as indicated by the broken-line frame in FIG. 3, and the area of the hollow region L is greater than or equal to the area of the incident surface of the optical lens p, in this way, it's possible to prevent a region other than the hollow region from blocking light and thus avoid the situation that light can not pass through the optical lens and in which test results are caused to be inaccurate. The main plane W of the first support bracket and the main plane V of the second support bracket are both perpendicular to the optical axis of the optical lens p of the optical test device.

The fastener 1013 flexibly connects the first support bracket 1011 and the second support bracket 1012, so that the glasses 06 is clamped between the main plane W of the first support bracket and the main plane V of the second support bracket, and the light received by the optical lens passes through the hollow region of the first support bracket, the hollow region of the second support bracket and one eyeglass of the glasses.

In practical applications, the fastener can adopt various structures, for example, a snapping connection, a bolted connection, and so on.

For example, as illustrated in FIG. 2, the fastener 1013 can comprise two sets securing bolts a and corresponding securing nuts b, wherein each of the sets comprises at least one securing bolt and corresponding securing nut b; the two sets of securing bolts a are arranged linearly in a direction perpendicular to the placement surface H of the optical test device, so as to respectively connect the upper and lower ends of the first support bracket 1011 and the second support bracket 1012, such that an eyeglass of the glasses 06 located between the main plane W of the first support bracket and the main plane V of the second support bracket is secured. Here, in the embodiment of the present disclosure, it is assumed that the direction perpendicular to the placement surface H of the optical test device is direction X as indicated in FIG. 3, and the upper ends among the upper and lower ends refer to the ends of the first support bracket 1011 and second support bracket 1012 away from the placement surface H of the optical test device, while the lower end among the upper and lower ends refer to the ends of the first support bracket 1011 and the second support bracket 1012 close to the placement surface H of the optical test device. Alternatively, each set of the securing bolts a can comprise two securing bolts, and accordingly, each set of the securing nuts b can comprise two securing nuts, the arrangement thereof can be seen in FIG. 3, the two sets of securing bolts a and corresponding securing nuts b are distributed around an eyeglass, so that this eyeglass can be effectively secured, due to two eyeglasses and the glasses frame being formed into one piece, securing one eyeglass can thus effectively secure the entirety of the glasses, securing one eyeglass is merely an example in the embodiment of the present disclosure. In practical applications, the areas of the main plane W of the first support bracket 1011 and the main plane V of the second support bracket 1012 can be increased, so that the clamping unit 101 can clamping the two eyeglasses simultaneously to secure the glasses more steadily.

Figure 7:
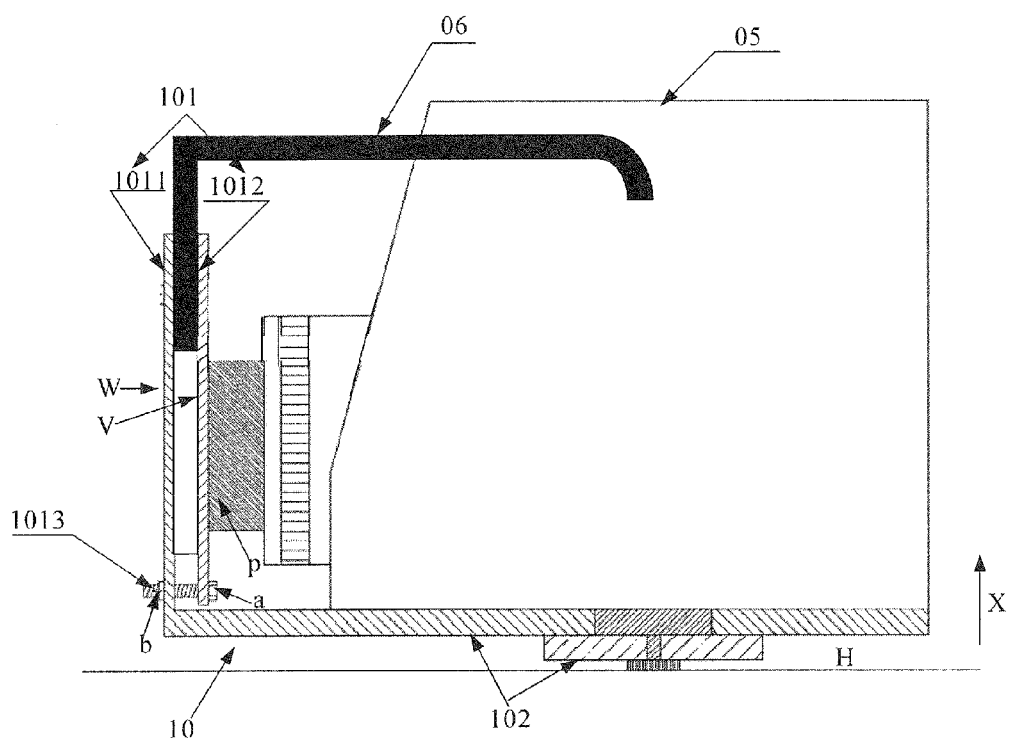
FIG. 7 is a view illustrating use of a glasses holder according to the embodiment of the present disclosure.

When the fastener adopts a bolted connection structure as illustrated in FIG. 2, in the optical performance test, firstly, a set of securing bolts a and corresponding securing nuts b located at the lower ends of the first support bracket 1011 and the second support bracket 1012 can be unscrewed, then a set of securing bolts a and corresponding securing nuts b located at the upper ends of the first support bracket 1011 and the second support bracket 1012 are unscrewed off, and then the glasses is clamped between the main plane W of the first support bracket and the main plane V of the second support bracket, as illustrated in FIG. 7, and the glasses is adjusted in place, then two sets of securing bolts a and corresponding securing nuts b at the upper and lower ends are screwed up so as to ensure effective securing of the glasses. When switching between the left and right eyeglasses of the glasses is required, the aforesaid process will be repeated, the description thereof is omitted here.

Figure 4:
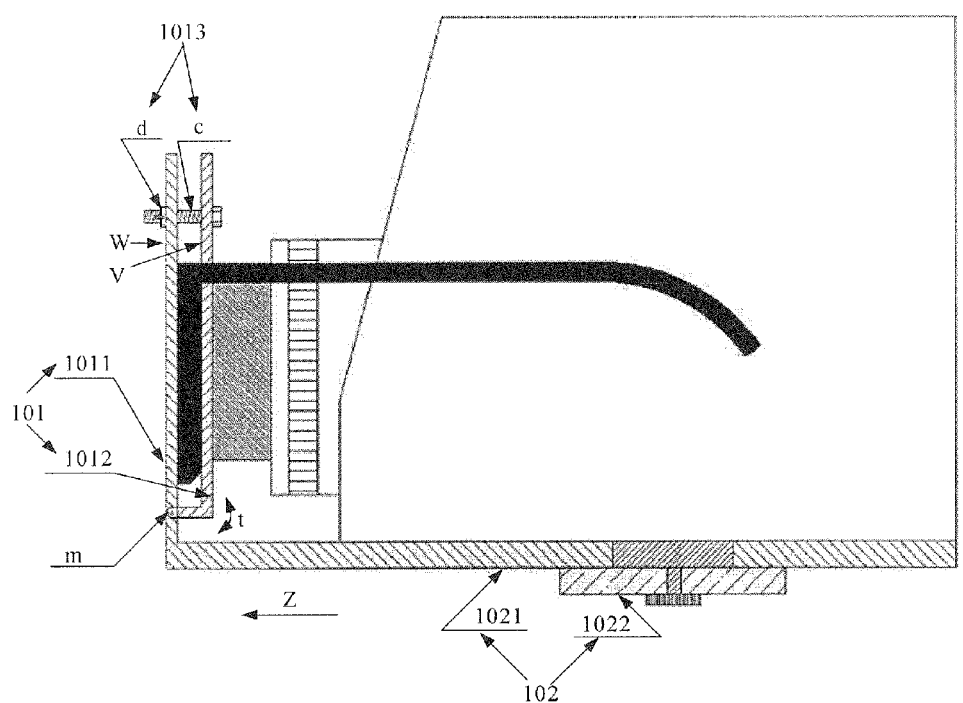
FIG. 4 is a structural side view illustrating another glasses holder according to one embodiment of the present disclosure.
Figure 5:
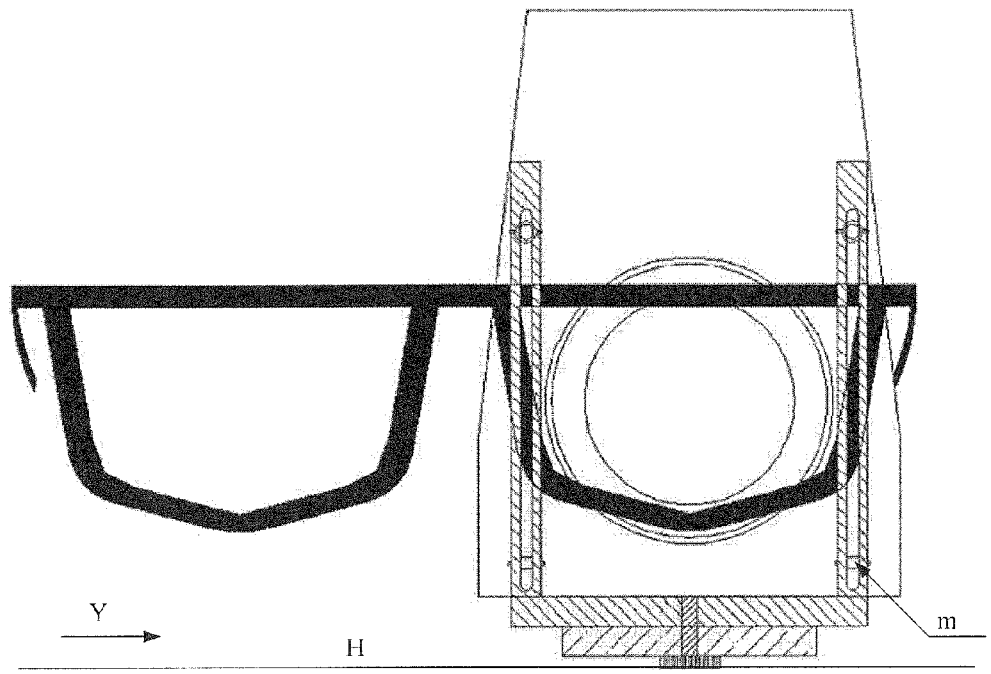
FIG. 5 is a front view of the structure the glasses holder as illustrated in FIG. 4.

For example, as illustrated in FIG. 4, the lower ends of the first support bracket 1011 and the second support bracket 1012 are in flexible connection, as illustrated in FIG. 5, the first support bracket 1011 and the second support bracket 1012 can be connected with a connection rod m which is perpendicular to the optical axis of the optical lens and parallel to the placement surface of the optical test device, the direction parallel to the incident surface of the optical lens and the placement surface of the optical test device is direction Y as indicated in FIG. 5, and with the connection by the connection rod m, the second support bracket 1012 can rotate clockwise or anticlockwise by taking the connection rod m as an axle center, thereby achieving the clamping or loosening of the upper ends of the first support bracket 1011 and the second support bracket 1012, such a rotation direction can be direction t as indicated in FIG. 4. Correspondingly, the fastener 1013 can comprise a set of securing bolts c and corresponding securing nuts d, and each set comprises at least one securing bolt c and corresponding securing nut d, for connecting the upper ends of the first and second support brackets 1011, 1012, so that one eyeglass of the glasses is secured between the main planes W, V of the first and second support brackets.

When the fastener adopts a bolted connection structure as illustrated in FIG. 4, in the optical performance test, firstly, a set of securing bolts a and corresponding securing nuts b located at the upper ends of the first support bracket 1011 and the second support bracket 1012 are unscrewed off, then the second support bracket 1012 rotates clockwise by taking the connection rod m as an axle center to increase the distance between the first support bracket 1011 and the second support bracket 1012, and then the glasses is clamped between the main plane W of the first support bracket and the main plane V of the second support bracket, and the glasses is adjusted in place, then the second support bracket 1012 rotates anticlockwise by taking the connection rod m as an axle center to decrease the distance between the first support bracket 1011 and the second support bracket 1012, and a set of securing bolts a and corresponding securing nuts b at the upper end are screwed up, so as to ensure effectively securing of the glasses. When switching between the left and right eyeglasses of the glasses is required, the aforesaid process will be repeated, the description thereof is omitted here.

Figure 6:
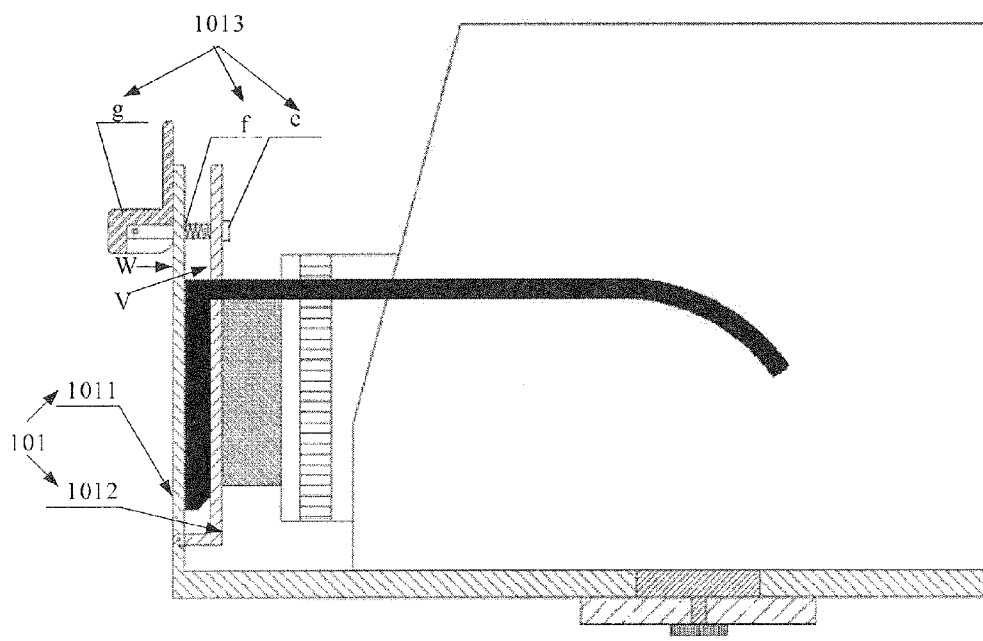
FIG. 6 is a structural side view illustrating still another glasses holder according to one embodiment of the present disclosure.

For example, as illustrated in FIG. 6, the fastener 1013 can further comprise a set of securing bolts e, and each set comprises at least one securing bolt e; an elastic element f sleeved upon the screw stem of each of the securing bolts e; a snapper g capable of snapping with the tail of the screw stem of each of the securing bolts e. The screw stem of the securing bolt passes through the main plane W of the first support bracket and the main plane V of the second support bracket, the elastic element is located between the main plane W of the first support bracket and the main plane V of the second support bracket. By snapping with the snapper g, the securing bolt e connects the upper ends of the first support bracket 1011 and the second support bracket 1012, such that one eyeglass of the glasses is secured between the main plane W of the first support bracket and the main plane V of the second support bracket.

When the fastener adopts a bolted connection structure as illustrated in FIG. 6, in the optical performance test, firstly, a set of securing bolts e and corresponding securing nuts b located at the upper ends of the first support bracket 1011 and the second support bracket 1012 as well as an elastic element f sleeved upon the screw stem of each of the securing bolts e can be unscrewed off, then the second support bracket 1012 rotates clockwise by taking the connection rod m as an axle center to increase the distance between the first support bracket 1011 and the second support bracket 1012, and then the glasses is clamped between the main plane W of the first support bracket and the main plane V of the second support bracket, and the glasses is adjusted in place, then the second support bracket 1012 rotates anticlockwise by taking the connection rod m as an axle center to decrease the distance between the first support bracket 1011 and the second support bracket 1012, after that, a set of securing bolts e at the upper end is screwed up, such that the elastic element f sleeved upon the screw stem of each of the securing bolts e produces elastic compression so as to ensure effectively securing the glasses, finally, the snapper g is snapped at the tail of the screw stem of the securing bolts e, in this way, since the elastic element f is located between the main plane W of the first support bracket and the main plane V of the second support bracket so as to apply outward elastic force to the first and second support brackets respectively, when the snapper g is removed, the distance between the first and second support brackets would increase due to the elastic force, thus facilitating to take out the glasses and improving the disassembly speed. When switching between the left and right eyeglasses of the glasses is required, the aforesaid process will be repeated, the description thereof is omitted here. It should be noted that, the elastic element f according to the embodiment of the present disclosure can be a compression spring.

As illustrated in FIG. 3, the clamping unit 101 can further comprise: slideways K disposed respectively at the main plane W of the first support bracket and the main plane of the second support bracket (FIG. 3 is a front view, the main plane of the second support bracket is invisible therein), and the length direction of the slideway K is parallel to the direction perpendicular to the placement surface of the optical test device (i.e., the direction X in FIG. 3). The screw stem of the securing bolt passes through the slideway K and connects the first and second support bracket, and can move along the slideway in the direction perpendicular to the placement surface of the optical test device. For example, as illustrated in FIG. 2, the screw rod of the securing bolt a passes through the slideway (not indicated in FIG. 2 and connects the first support bracket 1011 and the second support bracket 1012, and could move along the slideway in a direction perpendicular to the placement surface H of the optical test device, the direction perpendicular to the placement surface H of the optical test device can be the direction X as indicated in FIG. 2. Due to the movement of the securing bolt along the slideway in the direction perpendicular to the placement surface of the optical test device, the securing bolt could regulate the fixed position according to the dimensions of the glasses, thereby allowing the glasses holder to be applied to glasses of different sizes.

In particular, the sides of the main planes of the first and second support brackets contacting with the glasses can further be provided with a flexible gasket, the flexible gasket could be a rubber gasket and are used for improving friction forces at the sides of the main planes of the first and second support brackets contacting with the glasses, so that the glasses can be effectively clamped between the main planes of the first and second support brackets, thus preventing unstable securing which would otherwise cause test fail. And at the same time, if rubber material is employed, it's also possible to offer a cushion effect to the glasses frame and eyeglasses of the glasses, thus preventing the glasses from being damaged by forces for clamping. In practical applications, a thickness of the flexible gasket can be adjusted according to the types and specifications of the glasses, so that the glasses holder could be applied to various types of glasses.

Further, as illustrated in FIG. 4, the connection unit 102 comprises: a first connection element 1021 connecting the clamping unit with the optical test device to enable the clamping unit to move in a direction parallel to an optical axis of the optical lens, the direction parallel to the optical axis of the optical lens can be the Z direction as indicated in FIG. 4; and a second connection element 1022 connecting the first connection element 1021 with the optical test device to enable the gripper unit to move in a direction perpendicular to the optical axis of the optical lens and parallel to the placement surface of the optical test device, the direction perpendicular to the optical axis of the optical lens and parallel to the placement surface of the optical test device can be the Y direction as indicated in FIG. 3.

The first and second connection elements can adopt various structures, as long as it's possible to ensure that the clamping unit can move in a specified direction. For example, the first connection element can be a connection plate provided with a first snapping slot, and the length direction of the first snapping slot is parallel to the direction perpendicular to the incident surface of the optical lens, and the first snapping slot snaps slideably with the base of the optical test device. The second connection element can be a connection plate provided with a second snapping slot, and the length direction of the second snapping slot is parallel to the incident surface of the optical lens and to the placement surface of the optical test device simultaneously, the second snapping slot snaps slideably with the base of the optical test device.

In the glasses holder according to the embodiment of the present disclosure, the connection unit connects the clamping unit with the optical test device effectively, by securing the glasses by means of the clamping unit, the glasses can be effectively secured in front of the optical lens of the optical test device, accordingly, the glasses can be firmly secured, contamination to the glasses can be depressed, thus accuracy of the test result can be improved.

The foregoing are merely exemplary embodiments of the invention, but are not used to limit the protection scope of the invention. The protection scope of the invention shall be defined by the attached claims.

The present application claims the priority of the Chinese patent application No. 201310733511.x filed on Dec. 26, 2013, the disclosure of which is hereby entirely incorporated by reference.

The invention claimed is:

1. A glasses holder, comprising:
   a clamping unit for securing the glasses;
   a connection unit connected with the clamping unit and optical device respectively, so that an eyeglass of the glasses secured by the clamping unit is parallel to an incident surface of optical lens of the optical device;
   wherein
   the clamping unit comprises:
   a first and a second support brackets, a main plain of the first support bracket and a main plane of the second support bracket are both provided with a hollow region, and area of the hollow region is greater than or equal to area of incident surface of the optical lens, the main planes of the first and second support brackets are each parallel to the incident surface of optical lens of the optical device; and
   a fastener for flexibly connecting the first support bracket and the second support bracket, so that the glasses is clamped between the main planes of the first and second brackets, and light emitted or received by the optical lens passes through the hollow region of the first support bracket, the hollow region of the second support bracket and one eyeglass of the glasses.

2. The glasses holder according to claim 1, wherein
   the fastener comprises two sets of bolts and corresponding screw nuts, and each of the sets comprising at least one bolt and corresponding screw nut;
   the two sets of bolts are linearly arranged in a direction perpendicular to a placement surface of the optical device, respectively connecting an upper end and a lower end of the first support bracket and the second support bracket, so that an eyeglass of the glasses is secured between the main planes of the first and second support brackets.

3. The glasses holder according to claim 1, wherein
   the lower ends of the first and second support brackets are flexibly connected;
   the fastener comprises a set of bolt and corresponding screw nut, and each set comprises at least one bolt and corresponding screw nut, for connecting the upper ends of the first and second support brackets, so that an eyeglass of the glasses is secured between the main planes of the first and second support brackets.

4. The glasses holder according to claim 1, wherein
   the fastener comprises a set of bolt, and each set comprises at least one bolt;
   an elastic element sleeved upon a screw stem of each of the bolt;
   a snapper capable of snapping with the tail of the screw stem of each of the bolts;
   the screw stem of the bolt passes through the main planes of the first and second support brackets, the elastic element is located between the main planes of the first and second support brackets, and the bolt connects the upper ends of the first and second support brackets by snapping with the snapper, in such a way that an eyeglass of the glasses is secured between the main planes of the first and second support brackets.

5. The glasses holder according to claim 1, wherein the clamping unit further comprises:
   slideways disposed at the main planes of the first and second support brackets, the length direction of which is parallel to the direction perpendicular to a placement surface of the optical device;
   the screw stem of the bolt passing through the slideway and connecting the first support bracket and the second support bracket, and capable of moving along the slideway in a direction perpendicular to the placement surface of the optical device.

6. The glasses holder according to claim 1, wherein sides of the main planes of the first and the second support brackets contacting with the glasses are provided with a flexible gasket.

7. The glasses holder according to claim 1, wherein the connection unit comprises:
   a first connection element enabling the clamping unit to move in a direction perpendicular to the incident surface of optical lens;
   a second connection element enabling the clamping unit to move in a direction parallel to the incident surface of optical lens and to the placement surface of the optical device simultaneously.

8. The glasses holder according to claim 7, wherein the first connection element is a connection plate provided with a first snapping slot, a length direction of the first snapping slot is parallel to the direction perpendicular to the incident surface of optical lens, and the first snapping slot snaps slideably with the base of the optical device.

9. The glasses holder according to claim 7, wherein the second connection element is a connection plate provided with a second snapping slot, and a length direction of the second snapping slot is parallel to the incident surface of the optical lens and to the placement surface of the optical device simultaneously, the second snapping slot snaps slideably with the base of the optical device.

10. The glasses holder according to claim 3, wherein the clamping unit further comprises:
    slideways disposed at the main planes of the first and second support brackets, the length direction of which is parallel to the direction perpendicular to a placement surface of the optical device;
    the screw stem of the bolt passing through the slideway and connecting the first support bracket and the second support bracket, and capable of moving along the slideway in a direction perpendicular to the placement surface of the optical device.

11. The glasses holder according to claim 4, wherein the clamping unit further comprises:
    slideways disposed at the main planes of the first and second support brackets, the length direction of which is parallel to the direction perpendicular to a placement surface of the optical device;
    the screw stem of the bolt passing through the slideway and connecting the first support bracket and the second support bracket, and capable of moving along the slideway in a direction perpendicular to the placement surface of the optical device.

12. The glasses holder according to claim 2, wherein sides of the main planes of the first and the second support brackets contacting with the glasses are provided with a flexible gasket.

13. The glasses holder according to claim 3, wherein sides of the main planes of the first and the second support brackets contacting with the glasses are provided with a flexible gasket.

14. The glasses holder according to claim 4, wherein sides of the main planes of the first and the second support brackets contacting with the glasses are provided with a flexible gasket.

* * * * *